US009699578B2

(12) United States Patent
Crawford

(10) Patent No.: US 9,699,578 B2
(45) Date of Patent: Jul. 4, 2017

(54) AUDIO INTERFACE DEVICE

(71) Applicant: Ingenious Audio Limited, Edinburgh (GB)

(72) Inventor: John Crawford, Edinburgh (GB)

(73) Assignee: INGENIOUS AUDIO LIMITED, Edinburgh (GB)

(*) Notice: Subject to any disclaimer, the term of this patent is extended or adjusted under 35 U.S.C. 154(b) by 0 days.

(21) Appl. No.: 14/565,567

(22) Filed: Dec. 10, 2014

(65) Prior Publication Data

US 2015/0139440 A1 May 21, 2015

Related U.S. Application Data

(63) Continuation-in-part of application No. 13/198,913, filed on Aug. 5, 2011, now abandoned.

(51) Int. Cl.

| | |
|---|---|
| ***H04B 3/00*** | (2006.01) |
| ***H04R 27/00*** | (2006.01) |
| ***G10H 1/00*** | (2006.01) |
| ***G10H 3/18*** | (2006.01) |

(52) U.S. Cl.

CPC .......... *H04R 27/00* (2013.01); *G10H 1/0083* (2013.01); *G10H 3/186* (2013.01); *G10H 2240/305* (2013.01); *H04R 2227/003* (2013.01); *H04R 2227/005* (2013.01); *H04R 2420/07* (2013.01); *H04R 2420/09* (2013.01)

(58) Field of Classification Search

CPC ....... G10H 1/0083; G10H 3/186; H04R 27/00
See application file for complete search history.

(56) References Cited

U.S. PATENT DOCUMENTS

| | | | | |
|---|---|---|---|---|
| 5,025,704 | A | 6/1991 | Davis | |
| 7,818,078 | B2 | 10/2010 | Iriarte | |
| 2004/0010746 | A1* | 1/2004 | Lucas | H04L 1/0045 714/781 |
| 2004/0073692 | A1* | 4/2004 | Gentle | H04L 47/10 709/231 |
| 2007/0003073 | A1 | 1/2007 | Iriarte | |
| 2007/0137462 | A1 | 6/2007 | Barros et al. | |
| 2008/0047416 | A1 | 2/2008 | Cummings | |

(Continued)

FOREIGN PATENT DOCUMENTS

| | | |
|---|---|---|
| EP | 0366442 | 2/1990 |
| GB | 768088 | 2/1957 |

(Continued)

OTHER PUBLICATIONS

Search Report dated Nov. 12, 2012 in Application No. GB1113082. 0.

(Continued)

*Primary Examiner* — Regina N Holder
(74) *Attorney, Agent, or Firm* — Snell & Wilmer L.L.P.

(57) ABSTRACT

A wireless interface device for at least one of wireless transmission from an electric analog audio device or wireless reception at an electric analog audio device of an audio signal, comprises an audio connector jack plug or jack socket in communication with a system that is at least one of a wireless internet system or a WLAN-enabled system and connectable to at least one of an audio connector jack plug of the electric analog audio device, or an audio connector jack socket of the electric analog audio device.

22 Claims, 7 Drawing Sheets

(56) References Cited

U.S. PATENT DOCUMENTS

| | | | | |
|---|---|---|---|---|
| 2008/0187141 | A1 | 8/2008 | Wang | |
| 2008/0240108 | A1* | 10/2008 | Hyldgaard ............ | G10L 19/005 370/394 |
| 2009/0092152 | A1* | 4/2009 | Rajakarunanayake | H04L 1/0009 370/473 |
| 2010/0061466 | A1* | 3/2010 | Gozen ................... | G10L 19/167 375/240.28 |
| 2013/0109358 | A1* | 5/2013 | Balasubramaniyan | H04W 24/08 455/411 |

FOREIGN PATENT DOCUMENTS

| | | |
|---|---|---|
| GB | 2236643 | 10/1991 |
| GB | 2477634 | 8/2011 |
| WO | 2009052032 | 4/2009 |
| WO | 2009111815 | 9/2009 |

OTHER PUBLICATIONS

"I Know What The Future Of Guitar Amps Is: WiFi-Enabled Amplifiers!", The Gear Page, Jan. 2, 2008, downloaded Sep. 11, 2012 from: http://www.thegearpage.net/board/showthread.php?t=33349, pp. 1-4.

Ridden, Paul, "Go (almost) cable-free with Ion Audio's Guitar link Air", Gizmag, Feb. 6, 2012, downloaded Sep. 11, 2012 from: http://www.gizmag.com/ion-audio-guitarlink-air/21379/, pp. 1-6.

"Introducing Guitarlink Air Wireless Guitar System For Use With Amps, Computers, IPad Or IPhone", Ion Audio, Jan. 10, 2012, downloaded Sep. 11, 2012 from: http://www.ionaudio.com/news/pressreleases/introducing-guitarlink-air-wireless-guitar-system, 1 page.

Jakubisin at al., "Real Time Audio Transceiver Utilizing 802.11b Wireless Technology". SoutheastCon, 2007, IEEE Proceedings, pp. 692-697.

Office action dated Dec. 18, 2013 in U.S. Appl. No. 13/198,913.

Final Office Action dated Jun. 11, 2014 in U.S. Appl. No. 13/198,913.

* cited by examiner

AUDIO INTERFACE DEVICE

CROSS-REFERENCE TO RELATED APPLICATIONS

This disclosure is a continuation-in-part of and claims priority to and the benefit of, U.S. Ser. No. 13/198,913 entitled "AN AUDIO INTERFACE DEVICE" filed on Aug. 5, 2011 and is incorporated herein by reference in its entirety for all purposes.

FIELD

This disclosure relates to an interface device for transmitting audio data from or to analogue audio devices, for example between guitars and amplifiers. The audio data may be time critical audio data. More particularly, but not exclusively, the disclosure pertains to systems which include audio connector jack plug or audio jack socket connections.

The disclosure also relates, in various embodiments, to an audio effects device and, for example but not exclusively, to electric guitar effects systems.

BACKGROUND

In existing analogue audio signal-generating devices, analogue audio is output to wired audio connector jack plug or audio jack socket connections. Examples of existing audio connector jack plug or audio jack socket connections include headphones, earphones, guitar leads, RCA audio cables, XLR audio cables and the like.

For example, in existing electric guitar systems, an electric analogue audio signal is generated by the guitar and this is output to a physical cable attached to the guitar by a connector jack.

Physical cables have limitations in terms of physical range and electrical and mechanical issues relating to the cable, including electrical impedance and resistance. Such issues relating to the use of physical cables can present particular difficulties when using such cables to connect musical instruments, for example guitars, to amplifiers, effects pedals or other devices, for example computers or other recording equipment. In the context of live performance or recording sessions, the required wired interconnections to provide a desired configuration can be complex and physically obstructive or inconvenient.

Devices are known which convert the analogue signal from an analogue signal-generating device, such as a guitar, into a digital signal for transmission by radio (FM/AM/UHF/VHF) to an amplifier. While such prior art devices can provide cordless audio transmission, there are problems associated with such devices. For example, such devices often use conventional radio transmission systems such as FM, AM, UHF and VHF which are highly sensitive to electromagnetic interference. Such interference problems can be particularly serious in an enclosed space such as a recording studio or performance space, where there may be many devices or surfaces generating or reflecting electromagnetic radiation in an unknown and unpredictable fashion. Such interference issues can be particularly severe when it is desired to connect different pairs of devices over different radio channels. For example, operating multiple radio devices in a network such as guitar/effects pedal/amplifier is extremely difficult.

Prior art systems often require a dedicated transmitter device and a dedicated receiver device, and the receiver devices in particular can be physically large and unwieldy. Prior art systems are generally unsecure (due to the relative ease of a radio signal being intercepted by a third party).

Known systems, using radio rather than wired connections between devices, are difficult to use to obtain even simple, dedicated, networks of devices for example an electric guitar connected to a guitar amplifier.

Known systems also exist for recording audio signals from electrical musical instruments on personal computers. However, these systems require hardware devices to be connected by cables between the instrument and the computer.

Devices also exist today such as network media centres and wireless base stations which receive digital audio data, normally in the form of compressed files such as MP3, by means of WLAN Internet (for example transmitting data from a personal computer to a wireless networking device). Such devices function as receiver only and require a digital server system, typically a personal computer.

802.11 Wi-Fi is a primary standard for the generation of WLANs. Wi-Fi according to the 802.11 Wi-Fi specification may be described as not being time sensitive or as not operating in real time, because such Wi-Fi may be subject to latency or transmission delay. Wi-Fi is based on a 'better late than never' quality of service which allows data to be split into packets, the packets being recoverable out of sequence. As a packet radio system, external issues such as network congestion and radio interference can cause packet loss. Conventional Wi-Fi may address packet loss by network monitoring and the resending of lost packets.

Returning to features of guitars in particular, it is well known that many guitar players wish to modify the electric analogue audio signal produced by their guitar prior to amplification. To this effect the output signal from the guitar is initially sent via a first physical cable to an audio effects device which receives the electric analogue audio signal, applies sound effects such as delay, bass, treble and distortion to the signal before outputting the modified electric analogue audio signal across a second physical cable to the next device in the system; this is typically another effects device, a recording device or a guitar amplifier. Such audio effects devices, typically either foot pedals or rack mounted units, are connected in series using coaxial cables.

SUMMARY

In various embodiments, there is provided a wireless interface device for at least one of wireless transmission from an electric analogue audio device and wireless reception at an electric analogue audio device of an audio signal, comprising: —an audio connector jack plug or jack socket in communication with a system that is at least one of a wireless internet system or a WLAN-enabled system, and connectable to at least one of: —an audio connector jack plug of the electric analogue audio device, an audio connector jack socket of the electric analogue audio device.

The system may comprise a wireless internet transceiver.

The device may be configured to establish a wireless network with at least one other device. For example, the device may be configured to establish a wireless local area network (WLAN) with at least one other WLAN-enabled device. The establishment of a WLAN enables each device to address each other device individually if desired, and to send data, for example audio data, to a particular addressed device.

The device may provide for transmission of audio signals from an analogue audio signal-generating device across a wireless internet link, for example a wireless local area network (WLAN) and for the reception of the wireless internet signal and conversion back into analogue audio for output into an analogue audio signal-receiving device.

Standard audio connector jack plug or audio jack socket connections may be used to connect an interface device which converts the analogue audio into digital data, processes this data into wireless internet format and enables wireless internet transmission of the signal to a second interface device which will ensure the reception and re-conversion of said audio signal.

The device may use wireless internet standards which include coding techniques, for example orthogonal frequency-division multiplexing (OFDM) in IEEE 802.11a and 802.11g, which may both increase the maximum data rate and greatly reduce interference by splitting the radio signal into several sub-signals before they reach the receiver.

The device in some embodiments may be used as either a transmitter device or a receiver device, which can then be reconfigured at any time, to become either a receiver or a transmitter. This allows greater flexibility in use of the device and may make manufacture easier.

The use of wireless internet can provide a convenient method to network multiple devices together and may integrate security features such as Wi-Fi Protected Access (WPA) encryption, ensuring only the intended recipients of the data can decode the signal.

The device may allow direct wireless connection to wireless internet devices inside personal computers.

The electric analogue audio device may comprise at least one of an electric analogue audio signal-generating device or an electric analogue audio signal-receiving device.

The device may comprise at least one of a wireless internet radio and a processing resource that comprises at least one of an audio codec, a Media Access Controller (MAC) and a baseband processor.

The device may comprise a processing resource operable to configure the device as a member of a wireless network.

The processing resource may be configured to establish a wireless network connection with at least one further device. The processing resource may be configured to establish a wireless network connection with a plurality of further devices.

The processing resource may be configured to stream the audio signal to a selected at least one further device, optionally to a selected plurality of further devices.

The device may be configured to receive the audio signal or a plurality of audio signals, from a selected at least one further device.

The device may further comprise a user input resource for selecting a path for reception or transmission of the audio signal.

The device may further comprise a user input resource for selecting at least one further device with which to establish a network connection.

The device may further comprise a user input resource for selecting one of a plurality of transmit or receive paths, and the processing resource may be configured to establish a network connection with each further device for which a corresponding transmit or receive path has been selected.

The user input resource may comprise at least one of an electrical, mechanical, electro-mechanical switch or touch-screen element.

The device may be configured to operate in at least one of a transmit and receive mode, and the device further comprises a user input resource for selecting a transmit mode or a receive mode.

The user input resource may be configured to select a combined transmit and receive mode.

The wireless interface device may be portable and detachable.

The wireless interface device may further comprise at least one switch, wherein the wireless interface is configured to establish a wireless network with a further wireless interface device in response to operation of the at least one switch and operation of a corresponding at least one switch on the further wireless device. The at least one switch may comprise a path selection switch configured for selection of one of a plurality of paths, each path being for transmission and/or reception of the audio signal. The corresponding at least one switch may comprise a corresponding path selection switch configured for selection of one of the plurality of paths. The device may be configured to establish a wireless connection with the further device in dependence on the same one of the plurality of paths being selected for the further device using the corresponding path selection switch as is selected for the device using the path selection switch. The path selection switch may have a plurality of predetermined physical switch settings, each physical switch setting corresponding to a respective one of the plurality of paths.

The establishing of the wireless network in response to the operation of the at least one switch and the operation of the corresponding at least one switch may comprise sending an interrogation signal from the device to the further device, sending a path identifier from the device to the further device, the path identifier identifying the selected one of the plurality of paths for the device, receiving at the device a path identifier from the further device, the path identifier identifying the selected one of the plurality of paths for the further device, determining that the selected one of the plurality of paths for the device is the same as the selected one of the plurality of paths for the further device and establishing a wireless network connection between the device and the further device using the selected one of the plurality of paths for transmission and/or reception of the audio signal. A signal processing algorithm may be used to compensate for missing or dropped data packets. The signal processing algorithm may be an interpolation or extrapolation signal processing algorithm.

The audio signal may comprise a plurality of data packets, and the processing resource may be configured to replace at least one missing or dropped data packet by applying a signal processing algorithm based on at least one further data packet. The signal processing algorithm may comprise at least one of naïve repetition, cross-faded repetition, a fast Fourier transform based model, linear phase interpolation.

A buffer system may be used to send and receive audio to allow for timing issues. The audio signal may comprise a plurality of data packets, and the device may further comprise a buffer for storing data packets prior to transmission or after reception. The device may further comprise a processing resource configured to increase or decrease the size of the buffer in dependence on at least one signal condition. The processing resource may be configured to increasing the size of the buffer in response to an increased number of errors, missing packets or dropped packets. The processing resource may be configured to decrease the size of the buffer in response to a decreased number of errors, missing packets or dropped packets. The processing resource may be configured to increase the size of the buffer when a quiet portion of the audio signal is received.

A mute function may be applied to the output audio stream if there has been a specified interruption or delay in the audio path. The device may be for wireless reception of the audio signal at an electric audio analogue device. The device may further comprise a processing resource operable to apply a mute function to an audio output in response to a delay in the received audio signal. The device may further comprise a processing resource operable to apply a mute function to an audio output in response to an issue with the received audio signal.

The device may generate a service set identifier (SSID) for connection to other Wi-Fi devices. The device may comprise a processing resource operable to generate a service set identifier (SSID) for use in connection to at least one further device.

The device may be for wireless transmission from an electric audio analogue device. the device may further comprise a processing resource operable to change at least one transmission setting for the wireless transmission.

The at least one transmission setting may comprise a length of transmitted data packets. The at least one transmission setting may comprise the output power of a radio transmitter. The at least one transmission setting may comprise an interpolation or extrapolation algorithm. The at least one transmission setting may comprise a size of a buffer.

The device may change transmission settings based on a Quality of Service system based on successful transmission rate. The processing resource may be operable to change the at least one transmission setting in dependence on a rate of successful transmission.

The device may select the length of transmitted data packets. The device may change output power of the radio transmitter.

The device may apply CRC (Cyclic Redundancy Code) Packet integrity checks to the received Wi-Fi signal. The device may further comprise a processing resource configured to apply CRC (Cyclic Redundancy Check) packet integrity checks to the audio signal.

The device may send and receive a concurrent second compressed copy of the audio. The device may be configured to wirelessly transmit the audio signal and to concurrently transmit a compressed copy of the audio signal. The device may be configured to wirelessly receive the audio signal and to concurrently receive a compressed copy of the audio signal. The device may be configured to use the compressed copy of the audio signal in intervals in which the audio signal is unavailable.

In various embodiments, there is provided a system comprising a plurality of devices as claimed or described herein, wherein each of the devices comprises a user input resource for selecting at least one of a transmit or receive mode, and in operation a first of the devices for which a transmit mode is selected is configured to transmit the audio data to at least one further device for which a receive mode has been selected.

Each user input resource may be configured for selection of one of a plurality of transmit or receive paths, in operation the user input resource of the first device may be used to select a transmit path, and the first device may be configured to establish a network connection with each of the further devices for which a corresponding receive path has been selected.

The device may further comprise a digital/analogue converter operable to at least one of convert the audio signal between digital and analogue, convert the audio signal between analogue and digital.

The device may further comprise an audio processor for modifying the audio signal.

The modifying of the audio signal may comprise applying at least one audio effect to the audio signal, for example applying at least one guitar effect to the audio signal.

The electric analogue audio device may comprise an electric analogue signal generating device, for example at least one of an electric guitar, an electric bass guitar, an electrically amplified acoustic guitar, a guitar multi-effect device, an electric music keyboard, an audio mixing desk, a radio player, a mp3 player, a CD player, a personal computer, a television set, a cable or satellite set top box, a MP3 docking station, a mobile telephone, a video games system, a DVD player.

The electric analogue audio device may comprise an electric analogue audio signal-receiving device, for example at least one of a guitar amplifier, an audio mixing desk, a MP3 docking station, an audio amplifier system, a headphone, a speaker system, a hi-fi system, a mobile telephone, a video games system, a personal computer, a guitar multi-effect device.

The device may be configured to use Wired Equivalent Privacy (WEP) or Wi-Fi Protected Access (WPA), for example to prevent unauthorised access.

The wireless internet transceiver system may be compliant with the IEEE 802.11 set of standards.

The audio signal may be sampled at a rate of at least 44.1 kHz.

In various embodiments, there is provided a guitar audio effects device for the reception, modification and re-transmission of an audio signal, comprising a wireless internet transceiver system and an audio processor configured so that at least one of the reception and re-transmission is via wireless internet.

The device may comprise a user input resource for controlling the modification of the audio signal.

The user input resource may comprise at least one of a foot pedal, button or buttons, rotatable knob or slider switch.

At least one of the reception and retransmission may be via a wired connection and not via wireless internet.

The guitar audio effects device may further comprise a microprocessor, a Media Access Controller (MAC) and baseband processor and a wireless internet radio.

The wireless internet system may be configured to transmit to multiple devices. The wireless internet system may be configured to receive data from multiple devices. Wired Equivalent Privacy (WEP) or Wi-Fi Protected Access (WPA) is used to prevent unauthorised access.

The guitar audio effects device may incorporate at least one of: an electrical switch to power the device on or off; an electrical circuit to allow the reception of wired analogue electrical audio signal inputs and output transmission of the signal in wireless internet format; an electrical circuit to allow the transmission of a wired analogue electrical audio signal output from the reception of the signal in wireless internet format; an electrical circuit to configure the device as a member of a wireless network; a software program to configure the device as a member of a wireless network; a battery or wired power supply.

The wireless internet transceiver system may be configured to convert digital signals into the IEEE 802.11 wireless signal format.

The guitar audio effects device may incorporate an electrical circuit to allow connection to a computer to configure the audio effects and configure the device as a member of a wireless network.

The device may be embedded within the body of the electric analogue audio signal-generating device The device may be embedded within the body of the electric analogue audio signal-receiving device.

The wireless internet system may transmit to multiple devices and/or received data from multiple devices.

The device may incorporate at least one of: —an electrical switch to power the device on or off, an electrical circuit to configure the device into transmit or receive mode.

The device may comprise a dedicated analogue to digital convertor without the capability to convert digital audio to analogue audio to effect transmitter mode only, and/or may comprise a dedicated digital to analogue convertor without the capability to convert analogue audio to digital audio to effect receiver mode only.

The processing resource may comprise at least one of electrical circuitry and a software program. The device may comprise a battery or wired power supply. The device may incorporate a microprocessor to configure and control the wireless internet transceiver system.

In various embodiments, there is provided a method of transmitting audio data comprising receiving analogue audio data, converting the analogue audio data to digital data and transmitting the digital data via a wireless LAN.

The method may comprise receiving the digital data, modifying the digital data, and retransmitting the modified data.

In various embodiments, there is provided a wireless internet transmitter device; comprising an audio connector jack plug, an audio codec and a wireless internet transceiver; which will transmit audio data by wireless internet to a wireless internet receiver device; the receiver device also comprising a wireless internet transceiver, an audio codec and an audio connector jack plug.

In various embodiments, there is provided an audio effects device which receives audio data across a wireless internet link known as a wireless local area network (WLAN), modifies the audio signal and transmits the processed audio signal via WLAN.

The audio signal from an electric guitar may be wirelessly transmitted by WLAN to an audio effects device for the application of audio effects before being forwarded by WLAN to an audio receiver device, for example a guitar amplifier, guitar multi-effects device, personal computer or audio mixing desk.

There may also be provided an apparatus or method substantially as described herein with reference to the accompanying drawings.

Any feature in one aspect of the disclosure may be applied to other aspects of the disclosure, in any appropriate combination. For example, apparatus features may be applied to method features and vice versa. Systems, methods and computer program products are provided. In the detailed description herein, references to “various embodiments”, “one embodiment”, “an embodiment”, “an example embodiment”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

BRIEF DESCRIPTION OF THE DRAWINGS

The system and method will now be described solely by way of example and with reference to the accompanying drawings in which.

DETAILED DESCRIPTION OF VARIOUS EMBODIMENTS

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
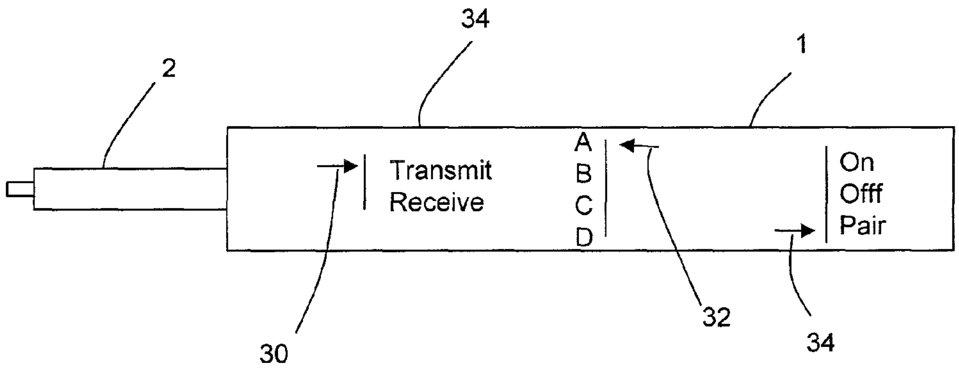
FIGS. 1 and 2 are schematic illustrations of interface devices according to an embodiment.

A wireless internet interface device 1 according to an embodiment is illustrated in FIG. 1. The device 1 comprises a jack plug 2 and a housing 34. In this case, the jack plug is a ¼ inch jack plug but any other type or size of jack plug can be provided in alternative embodiments. Three switches 30, 32, 34 are shown on the housing. The first switch 30 is operable to switch the device 1 between a transmit mode and a receive mode. The second switch 32 is operable to select one of a number of different transmission and reception paths (in this case four paths, labelled A, B, C and D). The third switch is operable to switch the device on or off, or to select a pair mode in which the device pairs with at least one further device. Selection of transmission and reception paths and pairing of different devices will be described in more detail below.

In the embodiment of FIG. 1, the switches 30, 32, 34 are electromechanical switches that can be manually operated by a user. Any suitable switches or user input devices or arrangements can be used in alternative embodiments, for example a touchscreen can be provided that includes buttons or menus for selection of transmission or reception modes, a selection of transmission or reception path, or selection of any other operating modes or options.

The wireless internet device 1 also includes the following components (not shown) in the embodiment of FIG. 1: a 3.5 mm headphone jack socket, allowing the user to listen with headphones without needing an external amplifier, a USB connector that can double as a 5V AC power connector, a power LED, a signal LED, battery connections for one or two AA batteries, and a volume control (for example a rotary up/down control).

Figure 2:
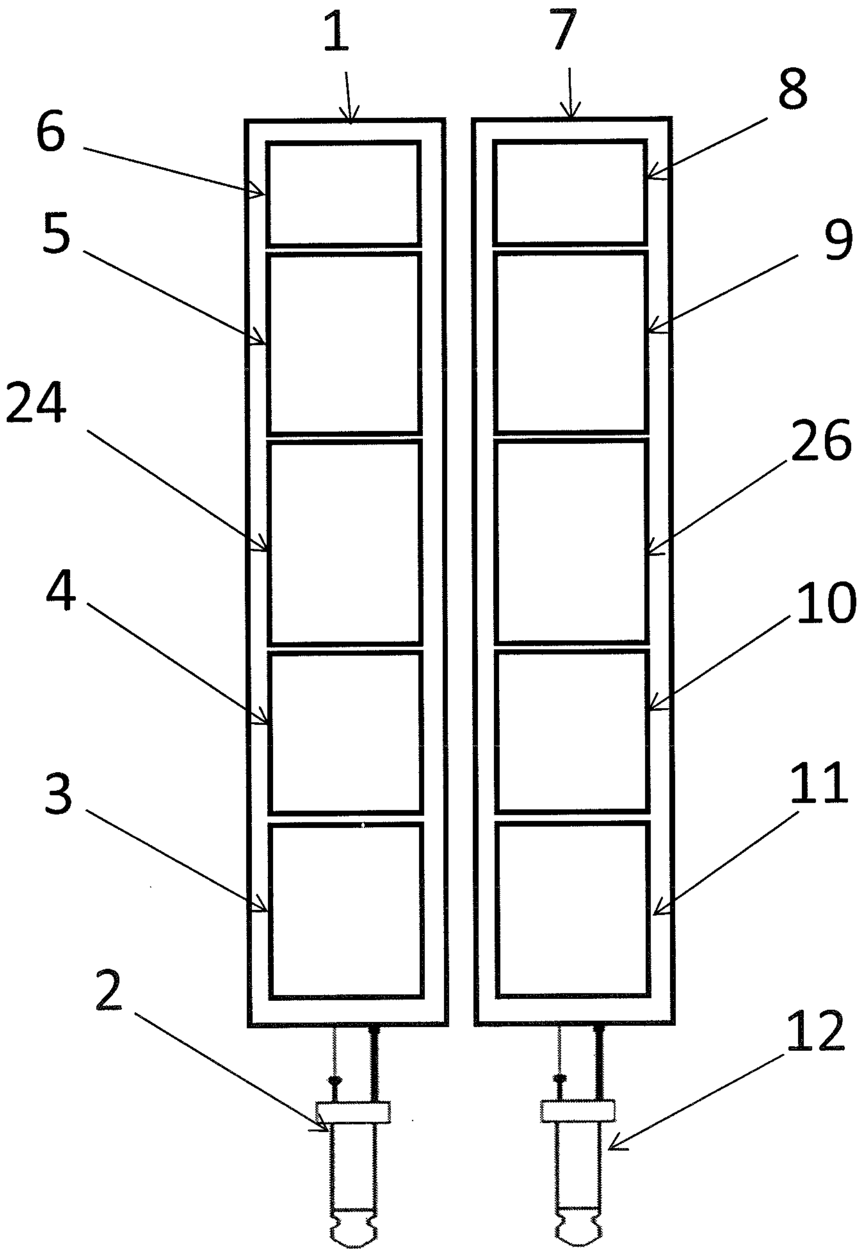

The wireless internet interface device 1 is illustrated in more detail in FIG. 2, which represents schematically various components that are provided within the housing 34. FIG. 2 also shows a second wireless internet interface device 7.

The device includes a signal conditioning circuit 3, connected to an audio codec 4, which in turn is connected to a microprocessor 24 and a WLAN Media Access Control (MAC) controller and a baseband signal processor 5. A WLAN radio 6 is also provided. The device also includes a power conditioning low dropout regulator (LDO), flash memory and RAM (not shown).

In the embodiment of FIG. 1, the signal conditioning circuit 3 and the audio codec 4 are provided together as an Analog Devices ADAU1446, SigmaDSP® digital audio processor. The chip 4 also includes the signal conditioning circuits 3 which include preamplifiers to adjust the input signal strength, bass and treble control, and a headphone amplifier.

In the embodiment of FIG. 1 the processor 24 is a Freescale iMX31 processor based on an ARM 1136JF-S® core running at up to 532 MHz, and is optimised for multimedia with minimal power consumption. In the mode of operation now described, the processor 24 is primarily used as a controller to receive and process user inputs, to control the chip 4 and the WLAN radio 6 and the other components, and to control the format of audio data received a transmitted by the device 1. In alternative modes of operation, more sophisticated audio processing is performed by the processor 24. In variants of the embodiment, a simpler processor, or other circuitry, is used in place of the processor 24, depending on the applications for which the device is to be used.

The WLAN radio 6 in this case is an integrated Wi-Fi radio module, which includes a single chip (SOC) Wi-Fi RF front-end module (FEM), and EPROM and a bandpass filter, and which also incorporates the WLAN MAC and baseband component 5 in this embodiment. The SOC contains a CSR6026 Wi-Fi chip from Cambridge Silicon Radio.

The Wi-Fi chip is able to operate at 2.4 GHz and to provide an IEEE 802.11 single spatial stream at 72.2 Mb per second. The Wi-Fi chip supports IEEE 802.11b/802.11g and IEEE 802.11n, including MPDU and MSDU aggregation, immediate block acknowledgement, PSMP and STBC. The chip provides advanced Unity IEEE 802.11/Bluetooth coexistence schemes that provide for IEEE 802.11 and Bluetooth operation using a single antenna. The chip provides full support for IEEE 802.11, WFA WPA/WPA2.

The components of the device 7 illustrated in FIG. 2 are the same as the corresponding components of the device 1 in this case. Thus, the jack plug 12 is the same as jack plug 2, signal conditioning circuitry 11 is the same as signal conditioning circuitry 3, the audio codec 10 is the same as audio codec 4, the processor 26 is the same as processor 24, the WLAN MAC and Baseband component 9 is the same as WLAN MAC and Baseband component 5 and the WLAN radio 8 is the same as WLAN radio 6.

In operation, the device 1 can be connected to an electric analogue audio device and used to convert audio signals, establish a WLAN with at least one further device, and to transmit the converted signals using wireless internet transmission. The device 1 can, alternatively, be connected to an electric analogue audio device and used to receive signals via a wireless Internet transmission, to convert the received signals to analogue audio signals and to provide them to the electric analogue audio device. The device is switchable between the transmit and receive modes.

In one mode of operation, which is now described with reference to FIG. 3, two or more devices 1, 7 are each connected to a respective electric analogue audio device, and are used to transfer audio signals using wireless internet transmission between the electric analogue audio devices.

In a mode of operation, the switch 32 is used by the user to select transmission/reception path A, and switch 30 is used to select transmission mode for the first interface device 1. Corresponding switches on the second interface device 7 are used to select transmission/reception path A, and to select reception mode for the second interface device 7. The switch 34 on the first interface device 1 is used to select pair mode, and the corresponding switch on the second device 7 is also used to select pair mode.

In response to selection of pair mode, the first interface device 1 transmits an interrogation signal determine whether there are any other devices within range with which it can pair. In the described embodiment, the interrogation signal includes an address or other identifier, for example an IP address, of the first device 1 and also includes a path identifier indicating that transmission/reception path A has been selected.

The second interface device 7 also transmits an interrogation signal, including the address or other identifier of the second device 7, and a path identifier indicating that transmission/reception path A has been selected by the second interface device 7.

Each of the devices 1, 7 receives the interrogation signal from the other of the devices 1,7, establishes that the other device is using the same transmission/reception path (A in this case) in and stores the IP address of the corresponding device, thus establishing a link with that of the device. When a link has been established, LEDs on both devices flash.

Subsequently, audio data transmitted via wireless internet by the first device 1 will be transmitted in packet form and will include the IP address of all devices with which it is has established a link. Thus, the audio data and can be selectively received and processed by the devices with which the first device has established a link.

In alternative embodiments, other methods for establishing a link between different devices 1, 7 can be used. For example, if two devices are to be linked then they can be configured to transmit data over a selected transmission frequency that is specific to the selected transmission/reception path.

The transmitting device 1 may be called the master device and the receiving device 7 may be called the slave device. In some embodiments, the processor 24 in the transmitting device 1 establishes an ad-hoc 802.11b/g Wi-Fi network, with a specific SSID (service set identifier) which is configured based on the device's MAC (media access control) address. The receiving device 7 scans for a valid SSID. If the receiving device 7 finds a suitable network, it connects to it. Therefore in this case, the receiving device may find a valid SSID which is the SSID of transmitting device 1, and connect to the Wi-Fi network that has been established by transmitting device 1.

Figure 3:
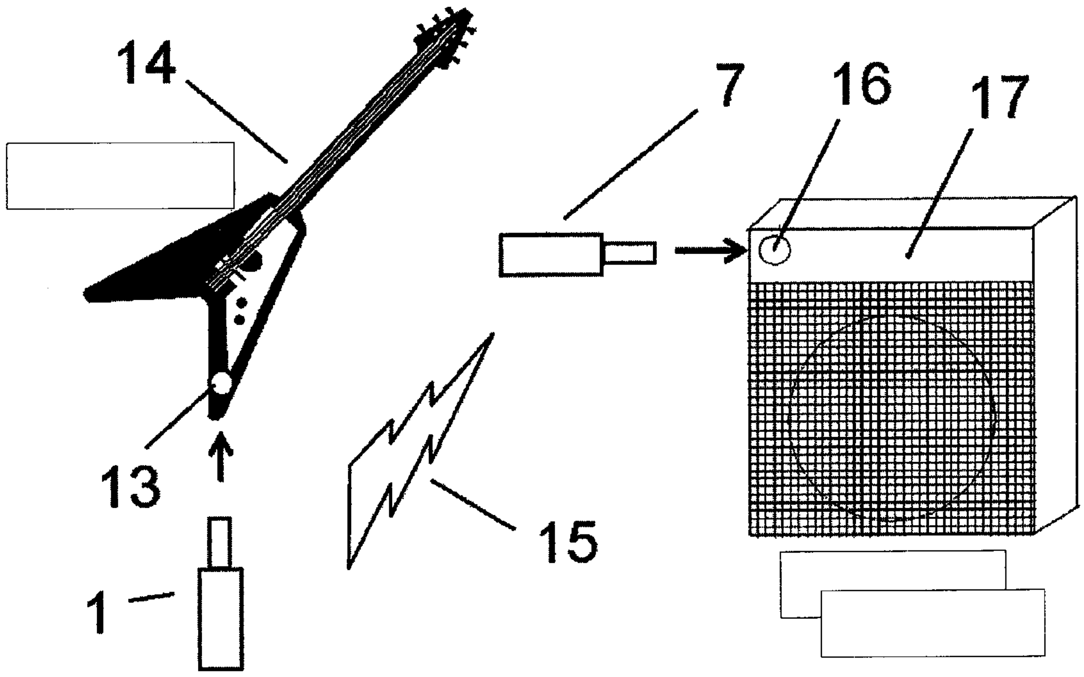
FIG. 3 is a schematic illustration showing a use of devices of FIGS. 1 and 2.

Once a link has been established, the jack plug of the first device 1 is connected to a jack socket 13 of an audio signal-generating device, in this case an electric guitar 14, as shown in FIG. 3. The jack plug of the second device 7 is connected to a jack socket 16 of an audio signal-receiving device, in this case a guitar amplifier 17.

In operation, the guitar can then be played by a user, generating analogue audio signals that are output via the jack socket 13 to the jack plug 2 of the interface device 1.

As already described, the audio connector jack plug 2 of the device 1, is connected to signal conditioning circuit 3. The signal conditioning circuit 3 adjusts the incoming analogue signal to the required voltage amplitude for entry to the analogue to digital convertor within the audio codec 4, for conversion into digital audio data. At this point the digital data is passed to the WLAN Media Access Controller (MAC) controller and baseband signal processor 5, to format the digital signal into WLAN packets and to manage the connection and control of the wireless network. The IP address of the device 7 to which the device 1 has established a link is included in the stream of packets.

This digital data, comprising the stream of WLAN packets, is passed to the WLAN radio 6 for transmission.

In the receiver device 7, the stream is received by the WLAN radio 8, passed to the WLAN MAC controller and baseband signal processor 9, which decodes the signal into digital audio data. The digital audio data is then converted by the digital to analogue convertor within the audio codec 10, and the analogue signal output is altered to the required voltage and electrical conditions of the input system (in this case amplifier 17) by the signal conditioning circuit 11, for output through the audio connector jack plug 12.

In some embodiments, the microprocessor 24 selects a length of transmitted data packets. The selected data packet length is implemented by the WLAN MAC and baseband component 5. Smaller packets are faster to send and therefore more packets may be sent in a given time. The use of small packets may reduce latency. The size of packets may also have an effect on dropped or latent packets, but the relationship between size of packet and the number of dropped or latent packets may depend on the cause of the drop or issue. The length of the data packets may be selected automatically by the processor 24 at start-up.

In some embodiments, the microprocessor 24 selects one or more transmission settings for the data transmission. For example, the microprocessor 24 may select a buffer size (the selection of buffer size is described in more detail below). The microprocessor may select a transmit power. The microprocessor 24 may select interpolation or extrapolation options (interpolation or extrapolation options are described in more detail below). The microprocessor 24 may change the transmission settings during a connection. For example, if quality of the received data is poor and/or the quality of the output audio stream is poor, the microprocessor 24 may adjust transmission settings to improve quality. The microprocessor 24 may change transmission settings based on a Quality of Service system. The Quality of Service may be based on a rate of successful transmission. The microprocessor 24 may choose to improve quality at the expense of increased latency.

In some embodiments, the WLAN radio 6 is configured to change its output power when instructed by the processor 24. The output power of the WLAN radio 6 may be changed automatically during a connection. For example, if the connection between a transmitting device 1 and receiving device 7 is working successfully, then the WLAN radio 6 may reduce its output power in order to conserve battery life. The WLAN radio 6 may reduce its output power to a minimum level. The minimum level may be the minimum power that is needed to maintain a connection with a further interface device 7.

The described embodiment enables a user to output audio signals from a guitar, or other instrument, to an amplifier in a selective manner without requiring the use of cables to link the guitar and the amplifier.

Several pairs or groups of devices 1, 7 can be provided, with each pair or group being using to link corresponding pairs or groups of devices via respective transmission paths. For example, one pair of devices 1,7 can be used to link a first guitar and a first amplifier and a second pair of devices can be used to link a second guitar and a second amplifier. If different transmission paths (for example A and B) are selected for the different pairs of devices, then in operation the first amplifier will amplify audio signals provided by the first guitar, without interference from audio signals from the second guitar, and the second amplifier will amplify audio signals provided by the second guitar, without interference from audio signals from the first guitar.

Both devices 1, 7 do not have to be connected via their respective jack plugs. For example, in one mode of operation, first device and second device are linked as already described, and the first device 1 is connected to the guitar 14. The second device 7 is connected to a laptop or other computer, for example via a USB connection. The laptop or other computer includes audio software that receives the audio signals from the guitar via the first device 1 and the second device 7. The audio software can be used to perform any desired operation. The received audio signals can also be recorded at the laptop computer. In that mode of operation, the received audio signals are provided by the device 7 to the laptop computer via the USB connection in digital format, without digital to analog conversion at the device 7.

In another configuration, if the laptop or other computer is WLAN enabled, the audio signals in wireless internet format can be transmitted from the device 1 directly to the laptop or other computer without requiring the further device 7.

In some embodiments, the connection between a transmitting device 1 and receiving device 7 may be made using an SSID based on the transmitting device's unique MAC address. Using an SSID rather than an adjustable IP address may make it easier for the transmitting device 1 to connect to a laptop or another computer, for example to a personal computer (PC).

In a variant of the embodiment of FIG. 1, alternative user input arrangements are provided, for example alternative switch arrangements that enable a device 1 to either transmit or receive over multiple selected paths (for example, A and B) simultaneously if so desired.

The use of WLAN provides easily configurable one-to-many and many-to-many connections. Possible uses of this feature include, a guitarist recording the guitar's output on a laptop computer while at the same time the output being played back through a guitar amplifier ("one-to-many") or two guitarists recording to the same laptop and playing back through the same amplifier simultaneously ("many-to-many"). The use of wireless internet allows the device 1 to easily connect to a range of existing and future WLAN capable devices including personal computers and wireless internet routers.

Figure 4:
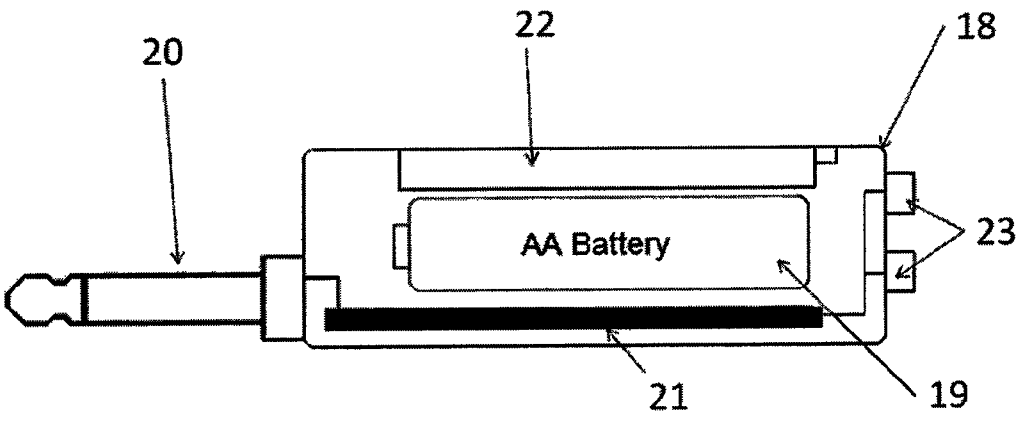
FIG. 4 is a schematic illustration of an interface device according to a further embodiment.

A further embodiment of an interface device 18 is illustrated in FIG. 4. The device 18 is powered by an AA battery 19. The device can be connected to an analogue signal-generating device by the audio connector jack plug 20, which is connected to a printed circuit board (PCB) 21, which includes the signal conditioning circuit, audio codec, WLAN MAC controller and baseband signal processor and WLAN radio as described in relation to FIG. 1. The embodiment has a removable battery cover 22, to allow replacement of the battery. User interface buttons 23 can be used to control operation of the unit.

Figure 5:
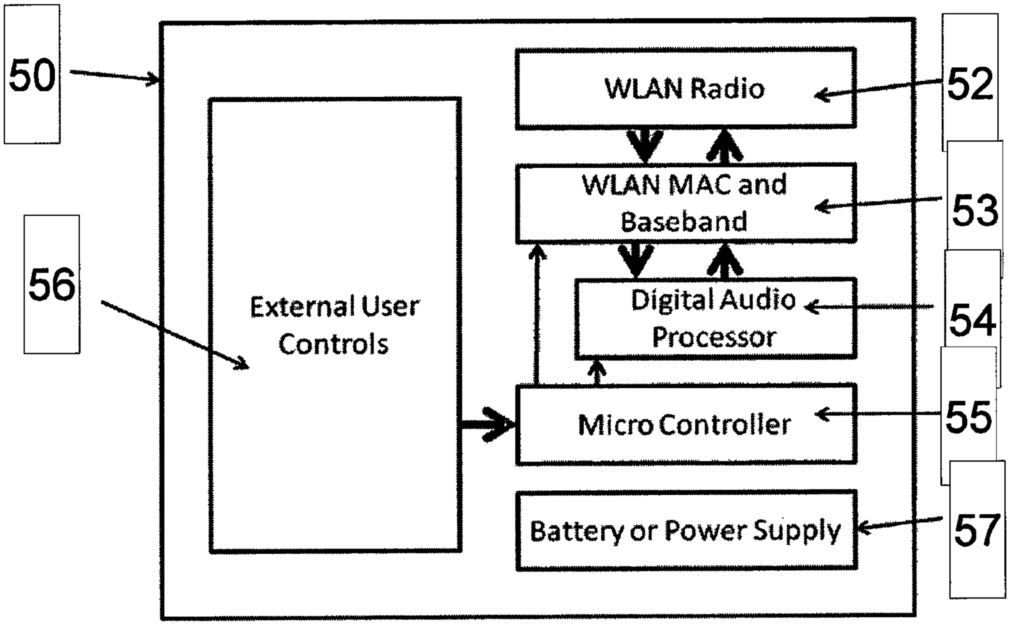
FIG. 5 is a schematic illustration of an audio effects device according to an embodiment.

A device 50 according to a further embodiment is illustrated in FIG. 5. In this case the device does not include a jack plug or jack socket. The device 50 is an audio effects device that comprises a WLAN radio 52, a WLAN MAC and Baseband processor 53, a digital audio processor 54, a microcontroller 55 and a battery or other power supply 57.

The device 50 also includes user input controls 56, in this case in the form of a pedal can be operated by a user's foot to control the amount of audio effect that is applied, and a control knob that can be used to select the type of audio effect, and at least one switch for selecting transmission/reception paths.

In the embodiment of FIG. 5, the components are the same as the corresponding components included in the embodiment of FIG. 1. Thus, for example, the WLAN radio 52 component is an integrated Wi-Fi radio module, which includes a single chip (SOC) Wi-Fi RF front-end module (FEM), and EPROM and a bandpass filter. The SOC contains a CSR6026 Wi-Fi chip from Cambridge Silicon Radio, the microcontroller 55 is a Freescale iMX31 processor based on an ARM 1136JF-S® core, and the digital audio processor 54 is a Cirrus Logic CS42L52 chip.

One mode of operation of the embodiment of FIG. 5 is described with reference to FIG. 6.

Figure 6:
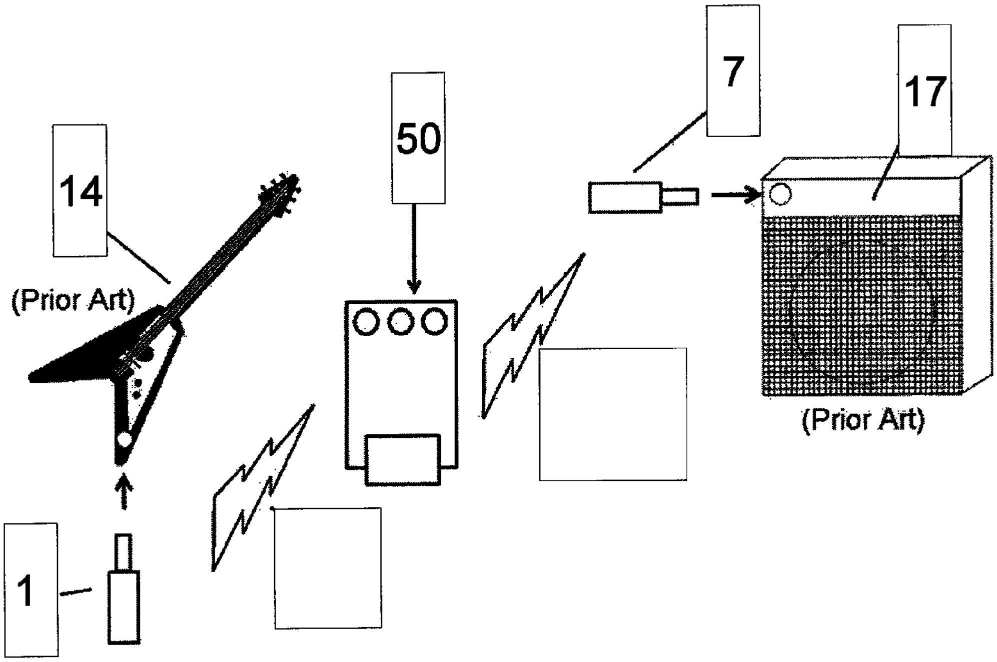
FIG. 6 is a schematic illustration showing a use of the device of FIG. 5.

In FIG. 6, interface device 1 is connected to electric guitar 14, and interface device 7 is connected to guitar amplifier 17, in a similar manner to that already described. In this case, transmission/reception path A is selected for interface device 1 and transmission/reception path B is selected for interface device 7.

In the case of the audio effects device 50, transmission/reception path A is selected for reception of signals and transmission/reception path B is selected for transmission of signals. The selection is made by the user, using the controls 56.

In operation, the devices 1, 7, 50 initially send interrogation signals and the device 1 pairs with the device 50 over transmission/reception path A, and the device 7 pairs with the device 50 over transmission/reception path B, in a similar manner to that already described in relation to FIG. 3.

The guitar 14 is then played by a user producing analogue signals which are converted to wireless internet signals and transmitted by the interface device 1 over the WLAN to audio effects device 50.

The audio effects device 50 receives the wireless internet signals via the WLAN radio system 52. The wireless internet signal is configured and decoded into digital audio data by the WLAN MAC and baseband component 53, and provided to the Digital Audio Processor 54, for the application of audio effects. The audio effects and the wireless network operation are controlled by the microcontroller 55, which is configured by the external user control system 56. The modified signal is passed back to the WLAN MAC and baseband 53 which formats the digital signal into WLAN packets and manages the connection and control of the wireless network, for transmission by the WLAN radio system 52 to the interface device 7 connected to the guitar amplifier 14.

The wireless internet packets representing the modified audio signal are received by the interface device 7 and converted back into analogue audio for input into the conventional analogue audio input guitar amplifier 14.

Any desired modification of the audio signal can be performed by the audio effects device 50, including any audio effects that can be provided by known guitar effects pedals. In one embodiment, the audio effects device 50 emulates a known guitar effects pedal in the effects that it provides, but enables wireless connection between a guitar and an amplifier, or between other devices. The audio effects device 50 can be used to apply any desired effects to any suitable audio signals, including audio signals obtained from musical instruments other than a guitar. The audio effects device 50 is not limited for use with a guitar.

Figure 7:
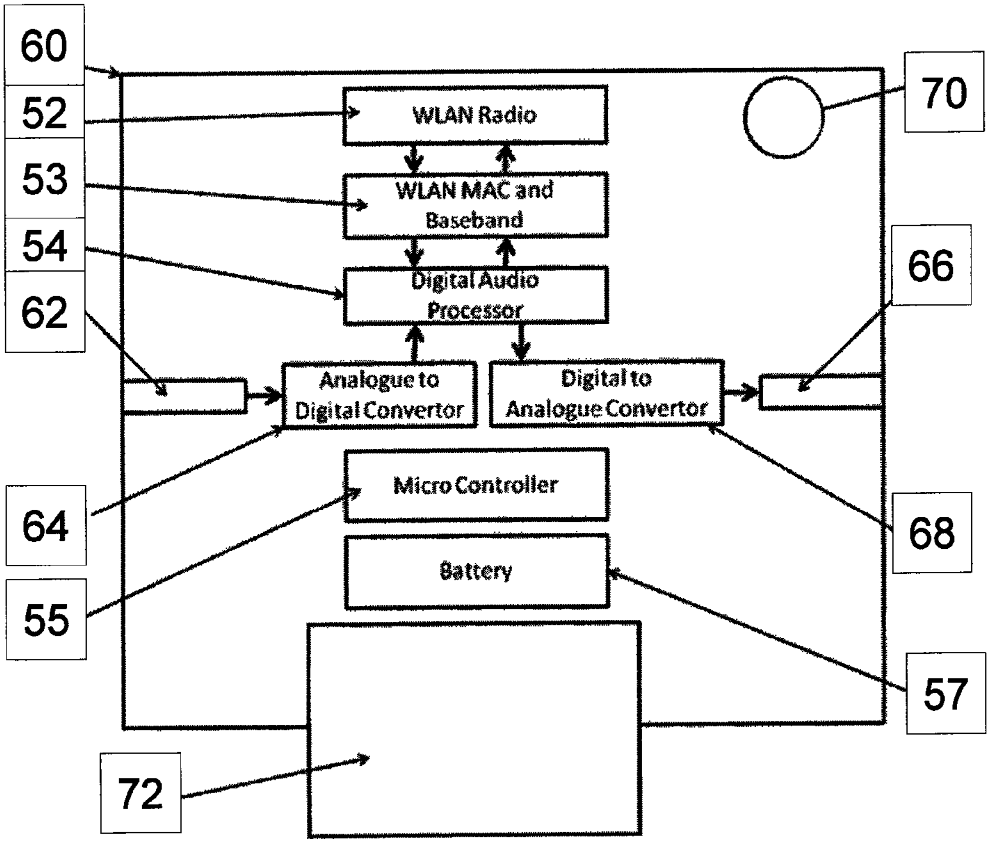
FIG. 7 is a schematic illustration of an audio effects device according to an alternative embodiment.

An alternative embodiment of an audio effects device 60 is illustrated schematically in FIG. 7. The device 60 includes many of the same components 52, 53, 54, 55, 56, 57 as the device 50 illustrated in FIG. 6.

In this case however, the device 60 also includes a standard audio input connector jack socket 62 which is connected to an analogue to digital converter 64, and a further standard audio output connector jack socket 66, which is connected to a digital to analog converter 68.

Using the jack socket 62, a known electric analogue audio device, for example guitar 14, can be connected to the audio effects device 60, using a wired connection. An analogue audio signal can be input to the device 60 from a wired connection into the input connector jack socket 62, and converted to digital audio by the analogue to digital converter 64, for processing by the digital audio processor 54.

The nature of the audio effects can be controlled by a simple external control knob 70 and can be applied or removed by the user operating a simple foot pedal 72 both of which communicate with the microcontroller 55, to control the digital audio processor.

The modified audio signal can then be output wirelessly by being passed back to the WLAN MAC and baseband 53 which formats the digital signal into WLAN packets and manages the connection and control of the wireless network, for transmission by the WLAN radio system 52.

Alternatively the audio signal can be output to a conventional wired analogue audio connection by the modified digital audio output from the digital audio signal processor being sent into the digital-to-analogue processor 68 before being output to the output connector jack socket 66.

The embodiment of FIG. 7 enables connection of the audio effects device 60 to electric analogue audio devices by any desired combination of wired and wireless connections.

Embodiments described herein can provide a simple connection system to allow wireless internet transmission of audio data from existing non-wireless interne capable, analogue audio signal-generating devices.

Embodiments described herein can also provide a simple connection system to allow the wireless internet reception of audio data, either modified or not, and the output of this audio data as analogue audio into existing non-wireless internet capable, analogue audio signal-receiving devices.

The devices of some embodiments allow the convenient application of user configurable audio effects to received audio signals, and can be conveniently connected in different networks of input, output and transceiver devices.

The devices of the described embodiments are portable and easy to use and can be used in a multitude of audio devices. The same device can be used as either the receiver device or the transmitter device, and can wirelessly connect to existing wireless internet capable devices such as personal computers.

The described embodiments allow an existing analogue audio signal-generating device (such as an electric guitar) to be connected by wireless internet through the connection of a simple, highly portable plug-in device. The devices form factor makes connection more convenient, highly portable and easily detachable allowing existing analogue audio signal-generating and signal-receiving devices to be operated using wireless internet or, in some embodiments, in a non-wireless internet form if desired.

The described wireless internet devices provide for physically smaller transmitter and receiver devices making the system more portable and therefore more convenient for use than is the case with previously known systems based on standard FM or AM transmission. The physically smaller devices that are possible allow for smaller “foot-pedal” type designs.

The networking capability of WLAN used in the present disclosure overcomes this hazard and allows the simple and independent operation of these types of networks.

The use of wireless internet or WLAN in this disclosure provides a convenient method to network multiple devices together while integrating security features such as Wi-Fi Protected Access (WPA) and encryption, ensuring that only the intended recipients of the data can decode the signal. Any suitable wireless internet systems and protocols may be used in alternative embodiments.

In order to connect to legacy wired systems it is possible to include analogue-to-digital and digital-to-analogue audio convertors in the audio effects device—allowing WLAN-to-WLAN, WLAN-to-analogue-audio and analogue-audio-to-WLAN connections.

Any suitable wireless internet protocols may be used, and embodiments are not limited to any particular internet protocol.

The described embodiments allow a user to modify a user-generated signal before retransmitting to a receiver device without the need for a personal computer.

With suitable custom software it is possible to configure a personal computer to receive a wireless signal and apply audio effects.

A simpler single function device, which requires a simpler, cheaper system architecture and design, with a convenient user interface system can be provided.

Examples of analogue audio signal-generating devices include electric guitars, electric music keyboards, televisions, personal computers, video cassette recorders and the like.

Examples of analogue audio signal-receiving devices include guitar amplifiers, televisions, personal computers, video cassette recorders, audio mixing desks and the like.

Some devices, for example guitar effects pedals, can be considered to be both analogue audio signal-generating and analogue audio signal-receiving devices. Such devices can receive analogue audio, alter the audio signal in either the analogue or digital domain before transmitting the audio to another device.

An audio codec may be an electronic circuit, for example in the form of an integrated circuit (IC) comprising an analogue-to-digital convertor (ADC) and a digital to analogue converter (DAC). A transceiver may be a device capable of both transmitting and receiving. A WLAN MAC and Baseband device or component may comprise an electronic circuit that may comprise a single integrated circuit consisting of a Medium Access Controller (MAC) and a baseband processor.

Embodiments described above may use Wi-Fi to transmit real time audio, for example in transmitting data from a guitar to an amplifier. The use of Wi-Fi for real time audio may introduce audio-specific issues that may not be applicable to non-real time audio purposes such as web browsing and email.

As a real time signal, it is desirable that an audio signal is not subject to latency or transmission delay. A delay of several milliseconds may not be a concern in conventional Wi-Fi when sending pre-recorded material or voice over IP. However, for musicians the delay between strumming a guitar string and hearing the corresponding note from the amplifier may be an important consideration. The transmitted audio data may be described as time critical audio data. Therefore, in some embodiments, actions are taken to optimize the latency and audio stream continuity of the system.

In some embodiments, a signal processing algorithm is implemented in the microprocessor 26 of an interface device 7 that is acting as a receiver device. The signal processing algorithm is used to compensate for missing or dropped packets in received data. The signal processing algorithm may be an interpolation or extrapolation signal processing algorithm. The signal processing algorithm may replace missing or dropped packets by extrapolating from previous packets or by interpolating between packets that occur before and after a missing packet.

The jitter of packets may be an important audio issue. Packets may arrive in sequence but with delays of the order of 30 ms to 60 ms. Packets may be received by a buffer, for example a ringbuffer. If the audio thread becomes ready to write to the audio device (for example, an amplifier) but the buffer is empty of packets, buffer starvation may occur and an audible glitch may be heard.

Several different interpolation or extrapolation systems may be used by the interpolation or extrapolation signal processing algorithm. Embodiments may employ at least one of the following interpolation or extrapolation systems and/or any other suitable interpolation or extrapolation system.

One interpolation or extrapolation system is repetition. If a gap in the received data occurs, nave repetition repeats the last packet received until the gap is over. Although naïve repetition fills in a signal using similar-sounding blocks, there may be noticeable clicking artifacts at buffer edges.

Another interpolation or extrapolation system is cross-faded repetition. If a gap in the received data occurs, a cross-faded repetition model forms a seamless, cross-faded loop from the two previous packets that were received immediately before the gap, and cross-fades to and from the interpolated loop. In some embodiments, three or more previous packets may be used to form the cross-faded loop. A cosine-based window may be used for equal-power cross-fading to avoid amplitude modulation artifacts.

A further interpolation or extrapolation system comprises an FFT-based (fast Fourier transform-based) model.

The signal may be reconstructed using the overlap-add method with von Hann windows. The magnitude spectrum may be decayed on each interpolated frame to produce a fading echo effect. A fading echo effect may sound better than a hard stop to the audio.

In conventional Wi-Fi, dropped packets may be addressed by network monitoring and the resending of lost packets. However, in real time audio, resending may not be possible since out of sequence audio data may disrupt the audio stream. Once the time period in which a packet was required has passed, it is not possible to replace the packet. The received data comprises samples of an analog audio signal. If a dropped or late sample is not compensated there may be an audible break in the output audio stream. If a dropped or late sample is not compensated there may be a click or a buzz in the output audio stream.

In some embodiments missing packets are replaced by the signal processing algorithm as mentioned above. The signal processing algorithm may compensate for dropped or late samples. Missing audio samples may be replaced by samples that are generated by the signal processing algorithm. Audible transient effects in the output audio stream may be reduced.

In one embodiment, a buffer system is used to send and receive audio to allow for timing issues. The interface device 7 comprises a memory which comprises the buffer. In the present embodiment, the buffer is implemented in software. The buffer is managed by the microprocessor 26. The buffer is a variable length packet buffer.

The microprocessor 26 intelligently resizes the buffer size based on the rate of incoming packets. The microprocessor 26 stores a maximum buffer size, and does not resize the buffer to a size that is greater than the maximum buffer size. The microprocessor 26 may select a longer buffer size if glitches (for example, missing or lost packets or delays in receiving packets) become more frequent. The microprocessor 26 may select a shorter buffer size if no glitches are occurring. The microprocessor 26 may change the buffer size automatically during a connection.

As the buffer tends towards exhaustion (approaches a stage of being empty), the processor 26 will demand extra packets. The extra packets may be supplied by interpolation or extrapolation. For example, the microprocessor 26 may perform interpolation or extrapolation of previous packets by using the signal processing algorithm described above. When the buffer has packets waiting to be played (which may be described as the buffer having spare capacity) then it may be that interpolation or extrapolation is not used.

In one embodiment, a semi-randomized approach (stochastic adaptive replenishment) is implemented. The semi-randomized approach links the probability of an interpolation or extrapolation demand to the current length of the queue (the number of packets that are stored in the buffer). When the buffer is empty, the probability of an interpolation or extrapolation demand is 1. When the buffer reaches the pre-defined maximum buffer length, the probability of an interpolation or extrapolation demand is 0.

The semi-randomized approach also uses weighting factors which attempt to minimize long bursts of interpolation or extrapolation and to instead spread bursts of interpolation or extrapolation over the signal. The weighting may preferentially load data into the buffer during very quiet periods of the signal. By having a large number of packets in the buffer, the audible impact of interpolation artifacts may be reduced.

By changing the length of the buffer, the latency of the system may be dynamically adjusted according to the signal conditions.

The maximum size of the buffer may be set at a value that avoids excessive latency. It may not be desirable to use lengthy buffering for persistent use due to the induced latency. However, a temporary increase in buffer size (while staying within the maximum buffer size) may reduce the number of glitches and improve the quality of the output audio stream.

In some embodiments, a mute function is applied to the output audio stream if there has been an interruption or delay in the data received by the interface device 7. The processor 26 may instruct the audio codec 10 to apply the mute function if there is an interruption or delay in the data received which lasts for more than a specified time. In one embodiment, the specified time is 60 ms from the last good packet received. Such a delay may be described as a jitter event of 60 ms. In further embodiments, the mute function may be applied in response to any issue with the received data, for example any error, corruption, interruption or delay.

Muting is a controlled process in the audio codec which stops the audio output without causing unwanted electrical issues. The muting process may be a controlled process which can be adjusted. The processor 26 may select one of a range of muting options in the audio codec. The muting process may produce an audio output that sounds better than a simple clamping of the signal to zero.

In some embodiments, muting is used in combination with interpolation or extrapolation, the interpolation or extrapolation being performed using the signal processing algorithm as described above. If the processor 26 determines that an absence of data or a data error cannot be adequately masked by a process of interpolation or extrapolation, the processor 26 instructs the audio codec 10 to apply the mute function.

In some circumstances, may be better for the audio output to be silent (through use of the mute function) than to apply inadequate correction. Intervals of missing or poor quality data may cause the output audio to be a random audio output. The random audio output may depend on the last successful data received, and may result in, for example, a click, pop or buzz. Inadequate correction or no correction may result in clicks, pops or buzzes. Intervals of muting may be very small (for example, 2 to 3 ms). Intervals of muting may be preferable to random output. Intervals for which muting is required (for example, intervals of missing data or poor quality data) may occur at random times and/or last for random durations.

In some embodiments, the microprocessor 24 applies CRC (cyclic redundancy code) packet integrity checks to the Wi-Fi data signal. CRC packet integrity checks are used to eliminate packets that may have been corrupted during transmission. Corrupted packets may result in artifacts at the receiving device 7.

In one embodiment, the microprocessor 24 of the transmitting device 1 applies a 32-bit CRC check each complete UDP (User Datagram Protocol) packet before the UDP packet is transmitted. The microprocessor 26 of the receiving device 7 verifies the CRC check at the receiver upon reception of the packet. Packets with non-matching CRCs are discarded and treated as lost.

Corrupted packets may be infrequent, but artifacts in the audio output stream that are the result of corrupted packets may be especially audible. Corrupted packets may result in a burst of noise. When the CRC check allows the corrupted packet to be replaced, for example by using the signal processing algorithm to interpolate a replacement. Replacing corrupted packets may allow graceful recovery from corruption.

In some embodiments, an interface device 1 is configured to send or receive a compressed copy of the audio signal. The sending or receiving of the compressed copy of the audio signal is concurrent with the sending or receiving of the main (uncompressed) data signal. The main data signal is encoded by PCM (pulse-code modulation).

The Opus codec (Internet Engineering Task Force standard RFC 6716) is capable of providing low-latency compression for music and voice signals. The Opus codec comprises a decoder that is capable of transparently applying packet loss concealment to recover missing frames. The Opus codec can encode forward-error-correction (FEC) to allow better recovery of missing data. The use of FEC may increase latency.

In one embodiment, the Opus codec is used to send and receive a compressed copy of a signal along with the main data signal. A compressed stream, for example the Opus compressed stream, is transmitted together with a raw, uncompressed PCM stream. The compressed stream may be transmitted simultaneously with the uncompressed stream. In some embodiments, the Opus codec is only used when the uncompressed stream is unavailable, and provides packet loss concealment only. The receiving interface device 7 is configured to use the compressed copy of the audio signal in intervals in which the main data signal is unavailable. In other embodiments, either the Opus compressed stream or the raw, uncompressed PCM stream may be sent alone.

It will be understood that the present disclosure has been described above purely by way of example, and modifications of detail can be made within the scope of the disclosure.

Each feature disclosed in the description, and (where appropriate) the claims and drawings may be provided independently or in any appropriate combination. Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An 802.11 wireless interface system configured to at least one of: wirelessly transmit an audio signal from an electric analogue audio device comprising an electric guitar, electric bass guitar or electrically amplified acoustic guitar, or wirelessly receive the audio signal from the electric analogue audio device, the system comprising:

an 802.11 wireless interface device comprising an audio connector jack plug or jack socket in communication with a system that is at least one of a wireless internet system or a WLAN-enabled system, wherein the audio connector jack plug or jack socket is connectable to at least one of an audio connector jack socket or jack plug of the electric guitar, the electric bass guitar, the electrically amplified acoustic guitar or the electric analogue audio device; and a processing resource operable to configure the wireless interface device as a member of a wireless network or to establish a wireless network connection with at least one further device, wherein the audio signal comprises a plurality of data packets, and the processing resource is configured to replace at least one missing or dropped data packet by applying a signal processing algorithm based on at least one further data packet;

the signal processing algorithm comprises at least one of an interpolation signal processing algorithm, an extrapolation signal processing algorithm, naive repetition, cross-faded repetition, a fast Fourier transform based model, or linear phase interpolation;

the wireless internet interface device further comprises a buffer for storing data packets prior to transmission or after reception; and the processing resource is configured to vary the size of the buffer by increasing or decreasing the size of the buffer in dependence on at least one signal condition, wherein the increasing or the decreasing the size of the buffer in dependence on the at least one signal condition comprises at least one of:

a) increasing the size of the buffer in response to an increased number of errors, missing packets or dropped packets;

b) decreasing the size of the buffer in response to a decreased number of errors, missing packets or dropped packets;

c) increasing the size of the buffer when a quiet portion of the audio signal is received, and wherein the wireless interface device is for wireless reception of the audio signal at an electric audio analogue device, the wireless interface device further comprising the processing resource operable to apply a mute function to an audio output in response to an error, corruption, interruption or delay of the received audio signal.

2. The system according to claim 1, wherein the processing resource is configured to stream the audio signal to a selected at least one further device.

3. The system according to claim 1, configured to receive the audio signal or a plurality of audio signals, from a selected at least one further device.

4. The system according to claim 1, further comprising at least one of a), b) or c):

a) a user input resource for selecting a path for reception or transmission of the audio signal;

b) a user input resource for selecting at least one further device with which to establish a network connection;

c) a user input resource for selecting one of a plurality of transmit or receive paths, wherein the processing resource is configured to establish a network connection with each further device for which a corresponding transmit or receive path has been selected.

5. The system according to claim 1, wherein the wireless interface device is configured to operate in at least one of a transmit or receive mode, and at least one of a) or b):

a) the wireless interface device further comprises a user input resource for selecting a transmit mode or a receive mode;

b) the wireless interface device further comprises a user input resource configured to select a combined transmit and receive mode.

6. The system according to claim 1, comprising a plurality of interface devices wherein each of the wireless interface devices comprises a user input resource for selecting at least one of a transmit or receive mode, and in operation a first of the wireless interface devices for which a transmit mode is selected is configured to transmit the audio data to at least one further device for which a receive mode has been selected.

7. The system according to claim 6, wherein each user input resource is configured for selection of one of a plurality of transmit or receive paths, and in operation the user input resource of the first wireless interface device is used to select a transmit path, and the first wireless interface device is configured to establish a network connection with each of the further devices for which a corresponding receive path has been selected.

8. The system according to claim 1, further comprising a digital/analogue converter operable to at least one of convert the audio signal between digital and analogue, or convert the audio signal between analogue and digital.

9. The system according to claim 1, further comprising an audio processor for modifying the audio signal, wherein the modifying of the audio signal comprises applying at least one audio effect to the audio signal.

10. The system according to claim 1 wherein the electric analogue audio device further comprises one of a guitar multi-effect device, an electric music keyboard, an audio mixing desk, a radio player, a mp3 player, a CD player, a personal computer, a television set, a cable or satellite set top box, a MP3 docking station, a mobile telephone, a video games system, a DVD player, a guitar amplifier, an audio mixing desk, an audio amplifier system, a headphone, or a speaker system.

11. The system according to claim 1, wherein at least one of:

the system is configured to use Wired Equivalent Privacy (WEP) or Wi-Fi Protected Access (WPA);

the wireless internet transceiver system is compliant with the IEEE 802.11 set of standards;

the system is configured to sample the audio signal at a rate of at least 44.1 kHz.

12. The system according to claim 1, wherein the wireless interface device is portable and detachable.

13. The system according to claim 1, the wireless interface device further comprising at least one switch, wherein the wireless interface is configured to establish a wireless network with a further wireless interface device in response to operation of the at least one switch and operation of a corresponding at least one switch on the further wireless device.

14. The system according to claim 13, wherein the at least one switch comprises a path selection switch configured for selection of one of a plurality of paths, each path being for transmission and/or reception of the audio signal;

wherein the corresponding at least one switch comprises a corresponding path selection switch configured for selection of one of the plurality of paths; and the wireless interface device is configured to establish a wireless connection with the further device in dependence on the same one of the plurality of paths being selected for the further device using the corresponding path selection switch as is selected for the device using the path selection switch.

15. The system according to claim 14, wherein the establishing of the wireless network in response to the operation of the at least one switch and the operation of the corresponding at least one switch comprises:

sending an interrogation signal from the wireless interface device to the further device;

sending a path identifier from the wireless interface device to the further device, the path identifier identifying the selected one of the plurality of paths for the device;

receiving at the wireless interface device a path identifier from the further device, the path identifier identifying the selected one of the plurality of paths for the further device;

determining that the selected one of the plurality of paths for the wireless interface device is the same as the selected one of the plurality of paths for the further device;

establishing a wireless network connection between the wireless interface device and the further device using the selected one of the plurality of paths for transmission and/or reception of the audio signal.

16. The system according to claim 1, further comprising a processing resource operable to generate a service set identifier (SSID) for use in connection to at least one further device.

17. The system according to claim 1, wherein the wireless interface device is for wireless transmission from an electric audio analogue device, the device further comprising a processing resource operable to change at least one transmission setting for the wireless transmission.

18. The system according to claim 17, wherein the at least one transmission setting comprises at least one of:

a) a length of transmitted data packets;

b) the output power of a radio transmitter;

c) an interpolation or extrapolation algorithm; or d) a size of a buffer.

19. The system according to claim 17, wherein the processing resource is operable to change the at least one transmission setting in dependence on a rate of successful transmission.

20. The system according to claim 1, further comprising a processing resource configured to apply CRC (Cyclic Redundancy Check) packet integrity checks to the audio signal.

21. The system according to claim 1, wherein the wireless interface device is configured to wirelessly transmit the audio signal and to concurrently transmit a compressed copy of the audio signal.

22. The system according to claim 1, wherein the wireless interface device is configured to wirelessly receive the audio signal and to concurrently receive a compressed copy of the audio signal, and wherein the wireless interface device is configured to use the compressed copy of the audio signal in intervals in which the audio signal is unavailable.

* * * * *